H. WULKAN.
PRODUCTION OF GLUCOSE FROM STARCH.
APPLICATION FILED NOV. 7, 1912.
Patented May 18, 1915.
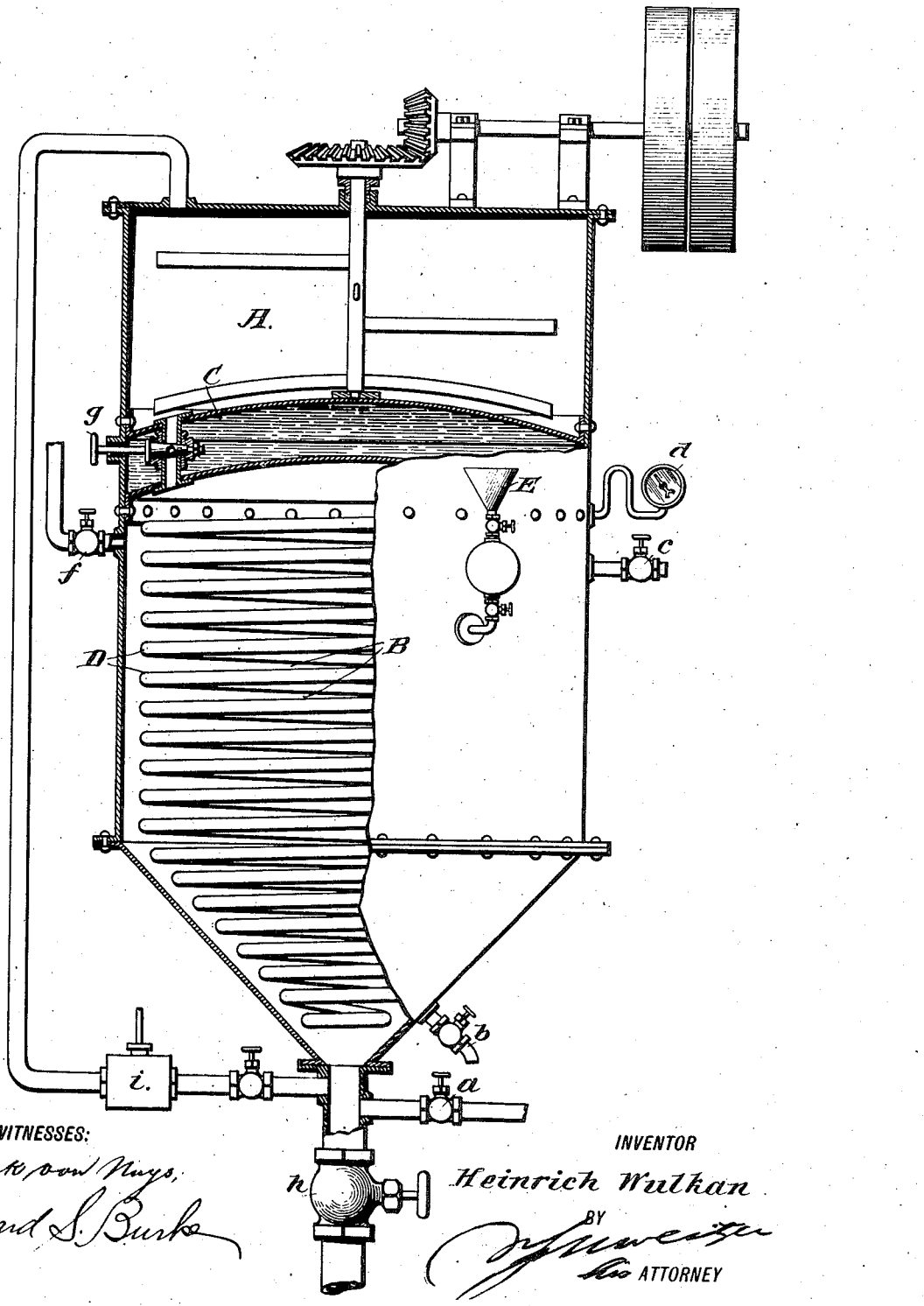
WITNESSES:
INVENTOR
Heinrich Wulkan
BY
ATTORNEY

UNITED STATES PATENT OFFICE.

HEINRICH WULKAN, OF BUDAPEST, AUSTRIA-HUNGARY, ASSIGNOR TO DEXTRIN AUTOMAT, GESELLSCHAFT M. B. H., OF VIENNA, AUSTRIA-HUNGARY, A CORPORATION OF AUSTRIA-HUNGARY.

PRODUCTION OF GLUCOSE FROM STARCH.

1,139,620.    Specification of Letters Patent.    Patented May 18, 1915.

Application filed November 7, 1912. Serial No. 730,071.

*To all whom it may concern:*

Be it known that I, HEINRICH WULKAN, a citizen of the Empire of Austria-Hungary, residing at Budapest, in the Empire of Austria-Hungary, have invented a new and useful Improvement in the Production of Glucose from Starch, of which the following is a specification.

This invention relates to the production of concentrated solutions of glucose from starch; and it comprises a process in which dilute inversion solutions are used to convert further quantities of starch into glucose, so that a more concentrated solution is obtained by the use of the same amount of acid and without further concentration; all as more fully hereinafter set forth and as claimed.

In the production of glucose, dextrose, etc., from starch, when the starch paste is boiled with dilute mineral acids such as sulfuric acid or hydrochloric acid there results a comparatively dilute solution containing only about 25 to 27 per cent. of dry substance; and in order to obtain a more concentrated solution from this dilute solution according to the processes heretofore practised, evaporation must be resorted to. Such concentrated solutions have heretofore also been made by the addition of water to the finished commercial articles, but such preparation of concentrated goods naturally requires previous concentration of the original dilute solutions.

If sulfuric acid is used for the inversion and calcium carbonate for neutralizing the acid after inversion, calcium sulfate is formed. Calcium sulfate is appreciably soluble in dilute solutions and more soluble in dilute solutions than in concentrated ones. The partial removal of this calcium sulfate in the bone black filter necessitates a more frequent renewal of the bone black used for clarifying the solutions than would otherwise be necessary; and the separating of the dissolved calcium sulfate upon concentration of the dilute solutions causes a deposit of this substance in the pipes and coils of the apparatus with resulting difficulty and expense in its renewal.

According to the novel process of the present invention concentrated solutions are obtained without the necessity of evaporating a more dilute solution. According to this process the dilute solution resulting from the inversion of the starch by dilute acid is used to convert a further portion of the starch into the glucose, dextrose, etc., so that as the result a more concentrated solution is obtained; and the concentration can thus be increased until a solution of sufficient concentration is obtained. It has been found that the dilute acid inversion solution is still capable of hydrolizing new quantities of starch and that the same solution can be used repeatedly for this purpose with resulting increase in concentration and in percentage of the inverted product. In the use of the dilute inversion solution for treating fresh quantities of starch, it is first cooled below the temperature of gelatinization of the starch before intermixing it with the fresh quantities of the starch, the conversion of the added starch being effected by subsequent heating after intermixture with the cooled inversion solution.

The so-called dilute acid inversion solution may be such a solution as results from the treatment of starch with dilute acid according to processes in which a dilute inversion solution is produced; or it may be a more concentrated solution resulting from an intermediate stage of the process of the present invention. When used repeatedly according to this process it gradually increases in strength until a solution of the desired concentration is obtained, the solutions more dilute than the final concentrated solution being as already indicated, capable of converting fresh quantities of starch into glucose. A further small amount of acid may be added to the dilute inversion solution. In such case there is obtained a slightly greater amount of acid in the concentrated solutions but with the very small amounts added this increase in concentration of the acid does not injuriously affect the product while it nevertheless facilitates the reaction.

After a solution of the desired or required concentration is obtained as already described, the solution can be neutralized by the addition of an alkaline or alkaline earth carbonate, or other suitable neutralizing agent. If the neutralization is effected in an open vessel carbonates such as sodium or calcium carbonate can be used. After neutralization the solutions which are already concentrated are at once available for use as concentrated solutions without further concentration. In case it is desired to neutralize the acid in the same vessel in which conversion is effected or in a closed circulation system carbonates cannot be used; but it has been found that in such cases borax may be used with advantageous results. Thus for instance the solution of borax is introduced in amount sufficient for complete neutralization, but a slight excess of borax may be used without imparting any injurious color to the solution.

An apparatus in which the process of the present invention can be carried out is illustrated in the accompanying drawings.

The apparatus here illustrated comprises a closed vessel divided by the hollow partition C into an upper chamber A provided with stirring means and a lower chamber B in which the conversion of the starch takes place. The chamber A is the stirring vessel for mixing the starch with the dilute acid, which mixture may be admitted to the conversion chamber B through the valve $g$. The partition C is shown in the form of a double wall forming an intervening space in which air or water can be circulated to prevent heating of the starch mixture in A by the inversion mixture in B. The lower chamber B is provided with a steam or liquid inlet valve $a$, a steam outlet valve $f$, a safety valve (not shown), and air valve $c$, a pressure gage $d$, starch mixture inlet $g$, outlet $h$, and sample cock $b$. It is also provided with a funnel inlet E provided with two stop cocks and with coils D which may be used either as a heating means for the inversion solution or a cooling means for cooling the dilute inversion liquor before adding further quantities of fresh starch. The valve $a$ can also be used for adding a further amount of dilute liquor or of a mixture of starch and acid to the conversion chamber B at the beginning of the process or at some intermediate stage. The upper chamber A is also provided with an inlet (not shown) for admission of the liquid starch mixture. At the bottom of the chamber B at $i$ the dilute acid inversion liquid may be raised to the top of the chamber A, where it can be mixed with a further quantity of starch and returned to the chamber B for the next stage of the reaction. In case borax is used for neutralizing the acid in the apparatus a solution of it can be introduced by means of the funnel E which is shown as provided with two stop cocks, so that the solution can be introduced even when the interior of the chamber B is under pressure. In this way the acid can be neutralized directly in the same vessel in which the acid inversion liquid is produced so that a neutralized and concentrated solution can be drawn off at the bottom of the vessel for further use directly without either concentration or neutralization. The acid can however be neutralized in a separate receptacle by means of a carbonate such as sodium or calcium carbonate but owing to the evolution of carbon dioxid an open vessel must be used or one in which provision is made for the escape of this gas. The use of borax however can take place in a closed vessel and as already stated in the same vessel in which the concentrated solution is obtained.

I claim:

1. The process of producing directly concentrated solutions of glucose which comprises treating starch with dilute acid to produce a dilute inversion solution, and treating fresh quantities of starch with such dilute solution to produce a more concentrated solution of glucose, whereby a concentrated solution of glucose is produced directly without evaporation.

2. The process of producing directly concentrated solutions of glucose which comprises treating starch with dilute acid to produce a dilute inversion solution, and treating fresh quantities of starch containing a small amount of acid with such dilute solution to produce a more concentrated solution of glucose, whereby a concentrated solution of glucose is produced directly without evaporation.

3. The process of producing concentrated inversion solutions which comprises reacting with a dilute acid inversion solution on fresh quantities of starch whereby a more concentrated inversion solution is obtained and reacting with the resulting inversion solution on a further quantity of fresh starch to produce a more concentrated inversion solution.

4. The process of producing concentrated inversion solutions which comprises reacting repeatedly with a dilute inversion solution upon fresh quantities of starch to produce a solution of gradually increasing concentration until a concentrated solution is obtained.

5. The process of producing concentrated inversion solutions which comprises reacting repeatedly with a dilute acid inversion solution upon fresh quantities of starch to produce a solution of gradually increasing concentration until a concentrated solution is obtained, and neutralizing the resulting concentrated solution by means of borax.

6. In the production of concentrated neutral inversion solutions of glucose the step which comprises neutralizing the concentrated acid inversion solution by means of borax.

7. In the production of inversion solutions the step which comprises neutralizing an acid inversion solution of glucose with borax.

In testimony whereof I have hereunto set my hand in the presence of two subscribing witnesses.

HEINRICH WULKAN.

Witnesses:
GUSTAV LEDERER,
ADA MARIA BERGER.